Patented July 1, 1941

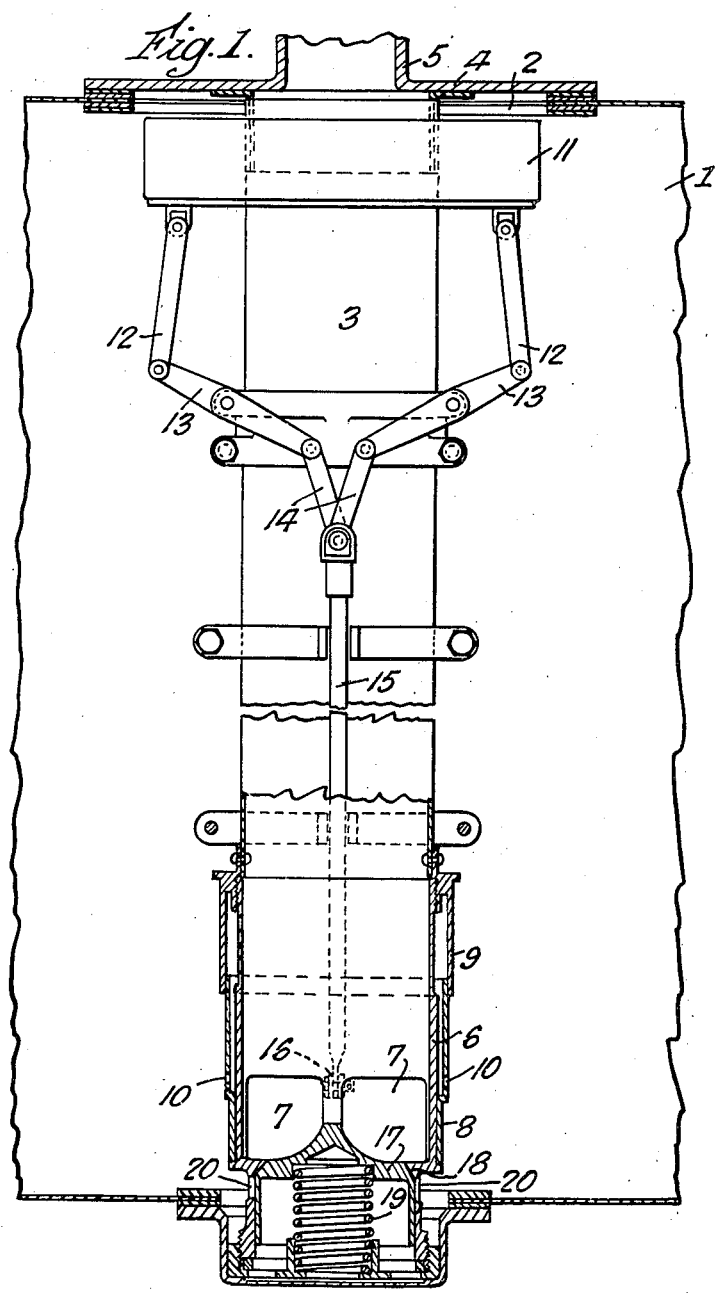

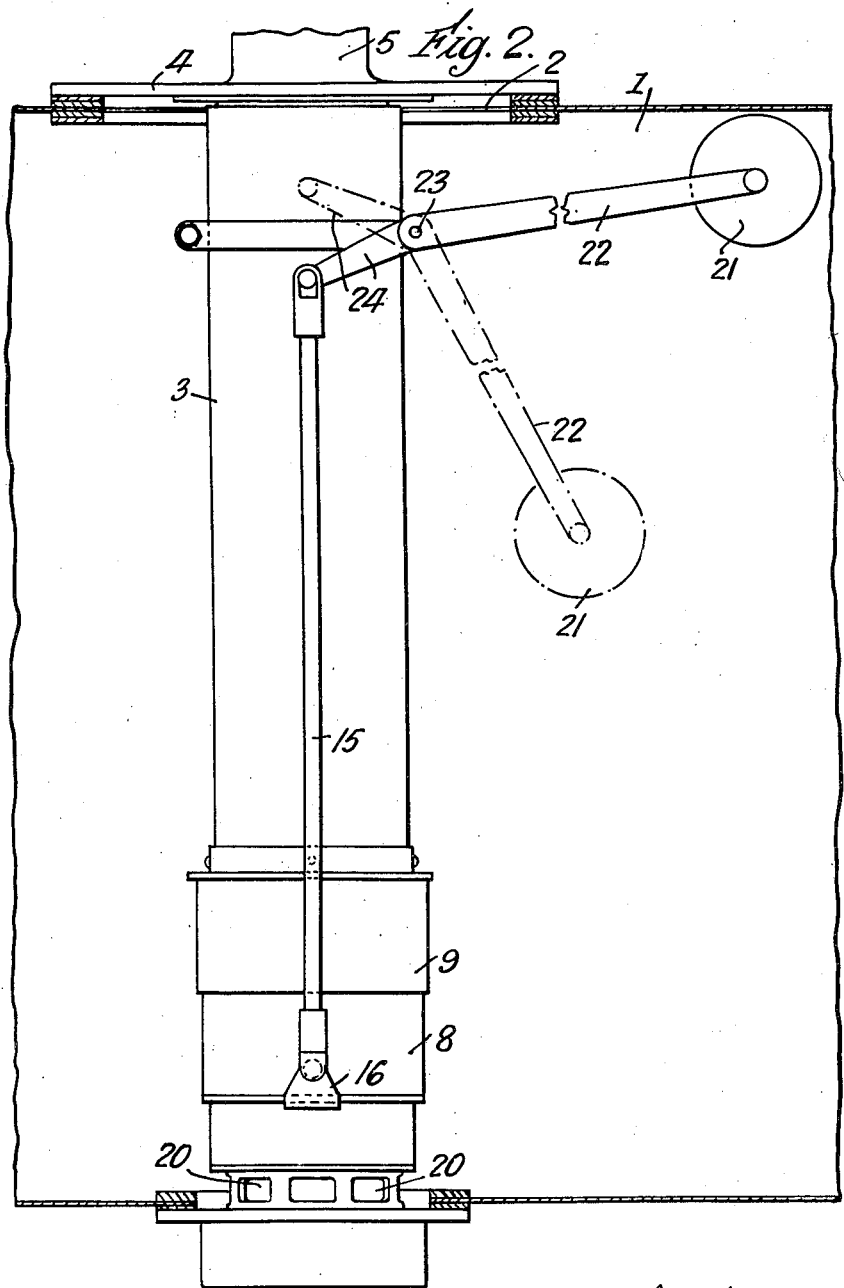

2,247,532

UNITED STATES PATENT OFFICE 2,247,532

DELIVERY MECHANISM FOR DELIVERING LIQUID SUCH AS FUEL TO TANKS

Edward James Tripp, Hillcroft, Stone Hill, Hanham, England, assignor to Flight Refuelling Limited, London, England Application August 23, 1940, Serial No. 353,979
In Great Britain August 19, 1939

6 Claims. (Cl. 137—68)

This invention relates to delivery mechanism for delivering liquid such as fuel to tanks and is concerned more particularly with mechanism for delivering fuel to the tanks of an aircraft.

The object of the invention is to provide means for preventing the over filling of tanks by closing the delivery pipe without however causing undue restriction to the flow or setting up severe pressure in the pipe line, whilst at the same time eliminating the danger of fire or explosion due to the formation of static or frictional electricity in the tank.

According to the present invention the delivery mechanism comprises a pipe extending downwards in the tank and provided with a lower portion constituting a valve body having a delivery outlet, a sleeve slidable over the valve body and a float connected to the sleeve and arranged to operate so that the delivery outlet is covered or uncovered according as the liquid is above or below a certain level in the tank.

Preferably the sleeve is so arranged and connected with the float that it moves upwards to uncover the outlet when the float falls and downwards to cover the outlet when the float rises. This may be achieved by interconnecting the float and sleeve through a linkage system.

In the preferred form, which gives a compact construction, the float is in the form of an annulus round the upper portion of the pipe.

For the purpose of relieving excessive pressure in the pipe which may be set up by a sudden closing of the sleeve valve, the valve body may comprise another outlet controlled by a relief valve normally urged upwardly on to a seating by a spring loading but adapted to be pressed down off the seating to open the said outlet if and when excessive pressure sets up.

Another constructional feature which may be incorporated is to form the sleeve valve with a part spaced away from the pipe and slidable within the outer guide sleeve. In this case one or more apertures may be provided in the said part (or alternatively in the pipe) to establish communication between the tank space (or the pipe) and the space between the said part and the pipe, thereby overcoming any suction effect between the sleeve valve and the outer guide sleeve. The advantage of this is that the sleeve valve will have an internal inner ledge which may be caused to be subjected to the force of the flow of liquid out of the pipe when the sleeve valve is nearing the closed position, and of being subjected, when the sleeve valve is in its closed position, to the pressure due to the different heads of liquid within the delivery pipe and in the tank, whereby to keep the sleeve closed down upon its seating until the different heads have been equalised by leakage of liquid from the pipe into the tank.

The invention is illustrated by way of example in the accompanying drawings, of which Figure 1 is a sectional elevation of one form of the delivery mechanism, and Figure 2 is a view in elevation of a modification of the construction in so far as concerns the arrangement of the float and its connection with the sleeve valve.

Referring to the drawings, the tank 1 has an opening 2 in its top portion into which extends a fuel delivery pipe 3. This pipe is carried by a cover plate 4 having a pipe portion 5 leading to a connection to a source of fuel supply.

The lower portion of the pipe 3 is fitted with a part 6 constituting a valve body which has a delivery outlet in the form of ports 7. A sleeve 8 is slidably mounted over the valve body and it is shown in its lower position where it covers the delivery ports 7. This valve sleeve 8 slides at its upper part in an outer guide sleeve 9 secured to the valve body. To overcome suction effect between the valve sleeve 8 and the guide sleeve 9 small or restricted leak apertures 10 are formed in the upper part of the valve sleeve 8. It will be seen that an inner ledge is formed between the lower part of the valve sleeve 8 and the upper part which slides in the outer guide sleeve 9. This ledge is exposed to the force of the flow of fuel through the bottom portion of the delivery pipe when the sleeve valve is nearing its closed position and thereby urging the sleeve valve to close completely. When the sleeve valve is closed the static pressure on the inner ledge as a pressure chamber is provided above the ledge between the part 6, valve sleeve 8 and guide sleeve 9, due to the difference of the heads of fuel in the delivery pipe and in the tank, acts on the inner ledge and keeps the sleeve closed on its seating until the different heads have been equalised by leakage into the tank through the apertures 10. Instead of the small apertures 10 being in the valve sleeve they may be in the valve body 6. There will normally be sufficient clearance or slack between the sleeve and the body to allow of sufficient leakage into the tank space for equalising the difference in head. It is not intended that the valve shall be absolutely fuel tight.

A float 11 in the form of an annulus around the upper portion of the pipe is connected, by means of the linkage and rod system 12, 13, 14, 15, (this is duplicated so that there is another such linkage and rod system on the rear side of the pipe) to the sleeve 8, the connection with the sleeve 8 being shown at 16.

In the bottom part of the valve body is a relief valve 17 pressed up against a seating 18 by the loaded compression spring 19. In the portion of the valve body just below the seating 18 are apertures 20 constituting another outlet which will come into operation if and when excessive pressure is set up in the pipe due, for example, to a sudden closing of the sleeve valve.

In operation, when the tank requires to be filled with fuel the float 11 will be in a fallen position and the valve sleeve 8 will have moved to an upper position which leaves the delivery ports 7 uncovered. Delivery of fuel into the tank through the pipe 3 and the delivery ports 7 causes the fuel level in the tank to rise and when this comes up to the float and continues to rise, the float will be raised by buoyancy and through the linkage and rod system will cause the valve sleeve 8 to be lowered to the position shown in the drawings where it covers the delivery ports. Further fuel delivery will then be cut off. If in this process excessive pressure is set up in the pipe, the relief valve 17 will be pressed down off its seating 18 and will open the outlet 20 in order to relieve the pressure.

As the fuel is delivered near to the tank bottom the risk of explosions, which are known to have been caused by spilling fuel freely into the tank so that electrical discharge may take place between the fuel and the tank, is greatly diminished.

In Figure 2 the construction of the pipe with its valve body and valves is substantially the same as in Figure 1, but the float arrangement differs in that the float is a ball 21 at the end of a lever 22 pivoted at 23 and having a portion 24 at the other side of the pivot linked with a rod 15 connected at 16 to the valve sleeve 8.

In operation the mechanism shown in Figure 2 is substantially the same as that shown in Figure 1.

What I claim is:

1. Delivery mechanism for delivering liquid to a tank comprising in combination with said tank a pipe extending downwards in said tank, a valve body constituted by a lower portion provided on said pipe and having a delivery outlet, a sleeve slidable over said valve body to cover and uncover said delivery outlet, a float surrounding an upper portion of said pipe, and a linkage system connecting said float to said sleeve so that said float and sleeve move in opposite directions.

2. Delivery mechanism for delivering liquid to a tank comprising in combination with said tank a pipe extending downwards in said tank, a valve body constituted by a lower portion provided on said pipe and having two delivery outlets, a sleeve slidable over said valve body to cover and uncover one of said delivery outlets, a float surrounding an upper portion of said pipe, a linkage system connecting said float to said sleeve so that said float and sleeve move in opposite directions, and a spring-loaded relief valve controlling the other of said delivery outlets.

3. Delivery mechanism for delivering liquid to a tank comprising in combination with said tank a pipe extending downwards in said tank, a valve body constituted by a lower portion provided on said pipe and having two delivery outlets, a sleeve slidable over said valve body to cover and uncover one of said delivery outlets, a float, a linkage system connecting said float to said sleeve so that said float and sleeve move in opposite directions, and a spring-loaded relief valve controlling the other of said delivery outlets.

4. Delivery mechanism for delivering liquid to a tank comprising in combination with said tank a pipe extending downwards in said tank, a valve body constituted by a lower portion provided on said pipe and having two delivery outlets, a sleeve slidable over said valve body to cover and uncover one of said delivery outlets, a float surrounding an upper portion of said pipe, a linkage system connecting said float to said sleeve so that said float and sleeve move in opposite directions, and a spring-loaded relief valve controlling the other of said delivery outlets.

5. Mechanism for delivering liquid to a tank comprising a pipe disposable downwards and including a valve body at the lower portion of said pipe having a delivery outlet, a sleeve slidable over said valve body to cover and uncover said delivery outlet, said sleeve having a part spaced away from a part of the pipe to form a pressure chamber, means coacting with said sleeve and valve body to close the pressure chamber, a ledge on the sleeve within the pressure chamber, one of said parts having a restricted leak aperture therethrough, and said ledge being so located that as the valve approaches closed position the chamber is brought into communication with the delivery outlet to build up pressure to cause the valve to close quickly.

6. Mechanism for delivering liquid to a tank comprising a pipe disposable downwards and including a valve body at the lower portion of said pipe having a delivery outlet, a sleeve slidable over said valve body to cover and uncover said delivery outlet, a guide sleeve on said pipe, said first mentioned sleeve having an upper part spaced away from a part of the pipe and closed by the guide sleeve to form a pressure chamber, a ledge on the first mentioned sleeve within the pressure chamber, one of said parts having a restricted leak aperture therethrough, said ledge being so constructed that as the valve approaches closed position the chamber is brought into communication with the delivery outlet to build up pressure to cause the valve to close quickly, said valve body having a second delivery outlet, a spring-loaded relief valve controlling the second delivery outlet, a float surrounding the upper portion of said pipe, and mechanism connecting said float to said first mentioned sleeve so that said float and said first mentioned sleeve move in opposite directions.

EDWARD JAMES TRIPP.